United States Patent
Goossen et al.

(10) Patent No.: US 8,667,473 B2
(45) Date of Patent: Mar. 4, 2014

(54) ANALYZING VIDEO GAME PERFORMANCE USING NON-INTRUSIVE CAPTURE AND STORAGE OF RUN-TIME GAME DATA

(75) Inventors: J. Andrew Goossen, Issaquah, WA (US); Parham Mohadjer, Redmond, WA (US); Matthew Kimball, Seattle, WA (US); Randal N. Linden, Mercer Island, WA (US); David Aronson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 1548 days.

(21) Appl. No.: 11/931,432

(22) Filed: Oct. 31, 2007

(65) Prior Publication Data

US 2009/0113303 A1   Apr. 30, 2009

(51) Int. Cl.
*G06F 9/44* (2006.01)
*G06F 11/00* (2006.01)

(52) U.S. Cl.
USPC .......................... 717/131; 717/124; 714/38.1

(58) Field of Classification Search
USPC ............... 717/124–135; 714/37, 38.1; 463/43
See application file for complete search history.

(56) References Cited

U.S. PATENT DOCUMENTS

| | | | | |
|---|---|---|---|---|
| 4,599,525 A | | 7/1986 | Tzeng | 307/234 |
| 5,526,286 A | | 6/1996 | Sauerwein et al. | 364/550 |
| 5,598,333 A | * | 1/1997 | Marsico, Jr. | 714/38 |
| 5,642,478 A | | 6/1997 | Chen et al. | 395/183.21 |
| 6,167,358 A | * | 12/2000 | Othmer et al. | 702/188 |
| 6,622,256 B1 | | 9/2003 | Dabral et al. | 713/600 |
| 6,631,423 B1 | * | 10/2003 | Brown et al. | 719/323 |
| 6,823,017 B1 | | 11/2004 | Davis et al. | 375/245 |
| 6,918,587 B2 | | 7/2005 | Duncan et al. | 271/260 |
| 7,533,371 B1 | * | 5/2009 | Johns et al. | 717/130 |
| 7,657,872 B2 | * | 2/2010 | Kelbaugh et al. | 717/124 |
| 2002/0049962 A1 | * | 4/2002 | Kelbaugh et al. | 717/128 |
| 2002/0092030 A1 | * | 7/2002 | Gu | 725/134 |
| 2004/0044859 A1 | * | 3/2004 | Wong | 711/156 |
| 2004/0102879 A1 | | 5/2004 | Raichle et al. | 701/29 |
| 2004/0213103 A1 | | 10/2004 | Wu et al. | 369/47.3 |
| 2005/0010909 A1 | * | 1/2005 | Lebee et al. | 717/124 |
| 2005/0200627 A1 | * | 9/2005 | Desylva | 345/520 |
| 2006/0259827 A1 | | 11/2006 | Sohm et al. | 714/38 |
| 2007/0005332 A1 | | 1/2007 | Armstead et al. | 703/23 |
| 2007/0058926 A1 | | 3/2007 | Virdi et al. | 386/68 |
| 2007/0165838 A1 | | 7/2007 | Li et al. | 379/406.01 |
| 2007/0279429 A1 | * | 12/2007 | Ganzer | 345/582 |

OTHER PUBLICATIONS

Bender et al., "Introduction to the Performance Analyzer for PlayStation 2," Mar. 6-8, 2003, Game Developers Conference, p. 1-57.*
Funk, A. et al., "Modelling Programmer Workflows with timed Markov Models", *CT Watch Quarterly*, 2006, http://www.ctwatch.org, 9 pages.

(Continued)

*Primary Examiner* — Qing Chen
(74) *Attorney, Agent, or Firm* — Judy Yee; Micky Minhas

(57) ABSTRACT

The performance of a video game is analyzed using non-intrusive capture and storage of game data. A non-linear capture format is used for capturing run-time game data. The run-time game data includes run-time parameters associated with execution of an application code as well as run-time parameters associated with hardware of a game platform upon which the application code is being executed. The captured data is stored in a storage medium using a non-contiguous storage format.

20 Claims, 7 Drawing Sheets

(56) References Cited

OTHER PUBLICATIONS

Kristic, A. et al., "Embedded Software-Based Self-Testing for SoC Design", *DAC*, 2002, 355-360, http://delivery.acm.org.

DIMACS Working Group: Algorithms for Multidimensional Scaling II, *Center for Discrete Mathematics & Theoretical Computer Science founded as a National Science and Technology Center*, 2003, 8 pages, http://dimacs.rutgers.edu.

\* cited by examiner

ANALYZING VIDEO GAME PERFORMANCE USING NON-INTRUSIVE CAPTURE AND STORAGE OF RUN-TIME GAME DATA

TECHNICAL FIELD

The technical field relates generally to gaming applications and specifically relates to non-intrusive capture and storage of run-time game data for analyzing the performance of a video game.

BACKGROUND

It is a well known fact among engineers that tracking down and rectifying an intermittent problem poses a greater challenge than rectifying a problem that is consistently observable and quantifiable. This fact holds true in the case of video games as well. Typically, an intermittent problem (often referred to as a "glitch") manifests itself in a video game in several different ways. For example, a glitch may be observed as a visual anomaly when viewing one or more images of the video game while the game is in progress. Some examples of visual anomalies include an image going black momentarily, or an image freezing for some length of time. On the other hand, an intermittent problem may also manifest itself in other ways. A few examples include a noticeable delay in executing a command provided through a joystick, or a lack of synchronization between an image and a sound track.

Traditionally, game developers attempt to rectify such problems by recreating the scenario wherein the intermittent problem was encountered and then troubleshooting the gaming application code and/or the video game hardware. As can be appreciated, the troubleshooting process often turns out to be a hit-or-miss affair for several reasons. The first reason pertains to accuracy in recreating the problem. This process involves a combination of factors—some of which are readily apparent and some of which are of a subtle and complex nature that is not readily apparent. Consequently, the success of the troubleshooting effort depends on the experience of the troubleshooter in predicting various possibilities for occurrence of the problem and accurately replicating the appropriate scenario.

The second reason pertains to pinpointing the root cause of the problem after observing the symptoms in the replicated scenario. Typically, a software developer uses diagnostic tools, such as breakpoints and customized pieces of troubleshooting code, to track down the source of the problem in the gaming application code. The success of this troubleshooting effort is dependent upon the capacity of the software developer to accurately predict potential problem areas in the gaming application code and insert, for example, one or more customized pieces of troubleshooting code for capturing relevant performance data during execution of the gaming application code.

In contrast to the troubleshooting approach used by the software developer, a hardware engineer (who often works independent of the software developer) may use other diagnostic tools, such as a logic analyzer for example, to track down a hardware component that may be malfunctioning. Here again, the success of the troubleshooting effort is dependent upon the capacity of the hardware engineer to identify the problem as either a hardware problem or a problem associated with execution of the gaming application code upon the hardware. As can be appreciated, this scenario often lends itself to finger-pointing and blame between the hardware engineer and the software developer.

In view of the description above, it can be understood that there is a need to provide solutions that address and overcome such traditional shortcomings.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

In one exemplary method for analyzing the performance of a video game using non-intrusive capture and storage of game data, a non-linear capture format is used for capturing run-time game data. The run-time game data includes run-time parameters and/or run-time measurements (e.g., measured time to perform an action) associated with execution of an application code as well as run-time parameters/measurements associated with hardware of a game platform upon which the application code is being executed. The captured data is stored in a storage medium using a non-contiguous storage format.

Furthermore, an exemplary system for analyzing the performance of a video game includes a game platform for running the video game and a debugger software module coupled to the game platform. The debugger software module is configured for capturing run-time game data (including audio and video data) from the game platform using a non-linear capture format that has minimal impact upon the performance of the video game. The captured run-time game data includes run-time parameters/measurements associated with the video game as well as run-time parameters/measurements associated with hardware in the game platform. The system further includes a storage medium configured to store the captured game data in a non-contiguous storage format.

BRIEF DESCRIPTION OF THE DRAWINGS

The foregoing summary, as well as the following detailed description, is better understood when read in conjunction with the appended drawings. For the purpose of illustrating non-intrusive capture and storage of run-time game data, there is shown in the drawings exemplary constructions thereof; however, non-intrusive capture and storage of run-time game data is not limited to the specific methods and instrumentalities disclosed.

DETAILED DESCRIPTION OF ILLUSTRATIVE EMBODIMENTS

It is to be understood that certain terms have been used herein merely for purposes of convenience and such usage should be interpreted broadly as would be apparent to a person of ordinary skill in the art. For example, the terms "software" and "code" as used below, should be interpreted as being applicable to software, firmware, or a combination of software and firmware. Similarly, the term "game data" should be interpreted as being applicable to a wide variety of information pertaining to a game, some of which may be captured and stored in hardware, and some of which may be merely visual observations made by a developer or a game player.

The following description generally provides details of systems and methods for analyzing the performance of a video game by non-intrusively capturing and storing run-time game data during execution of gaming application code. Run-time game data can include any combination of audio data, video data, GPU data, CPU data, or the like. The non-intrusive nature of the data capture permits operation of the video game without extrinsically contributing to the problem or significantly affecting game performance. Typically, the run-time game data is captured using a circular data logging process whereby data is captured on a continuous basis and can be accessed at a later instant for analyzing game performance or for troubleshooting purposes.

In one exemplary application, the captured game data is used for rectifying an intermittent problem that occurs during operation of the video game. To describe this exemplary application in more detail, a developer notices an abnormality (such as a slower-than-normal frame refresh rate or a suspicious spike in a particular video frame) when the video game is in progress. In the background, without any active intervention by the developer, the data capture system has been continuously capturing run-time game data. Upon noticing the abnormality, the developer stops/pauses the game and retrieves the captured run-time game data for examining the status of various parameters at the moment in time when the abnormality occurred. This allows the developer to pinpoint the cause, if any is present, in the gaming application code. The captured run-time data additionally provides information that may be used to identify a problem as being located in the video game hardware rather than in the gaming application code. In certain cases, the root cause of the observed abnormality may be traced to a combination of software and hardware. Further details of this aspect as well as other aspects are provided below.

Figure 1:
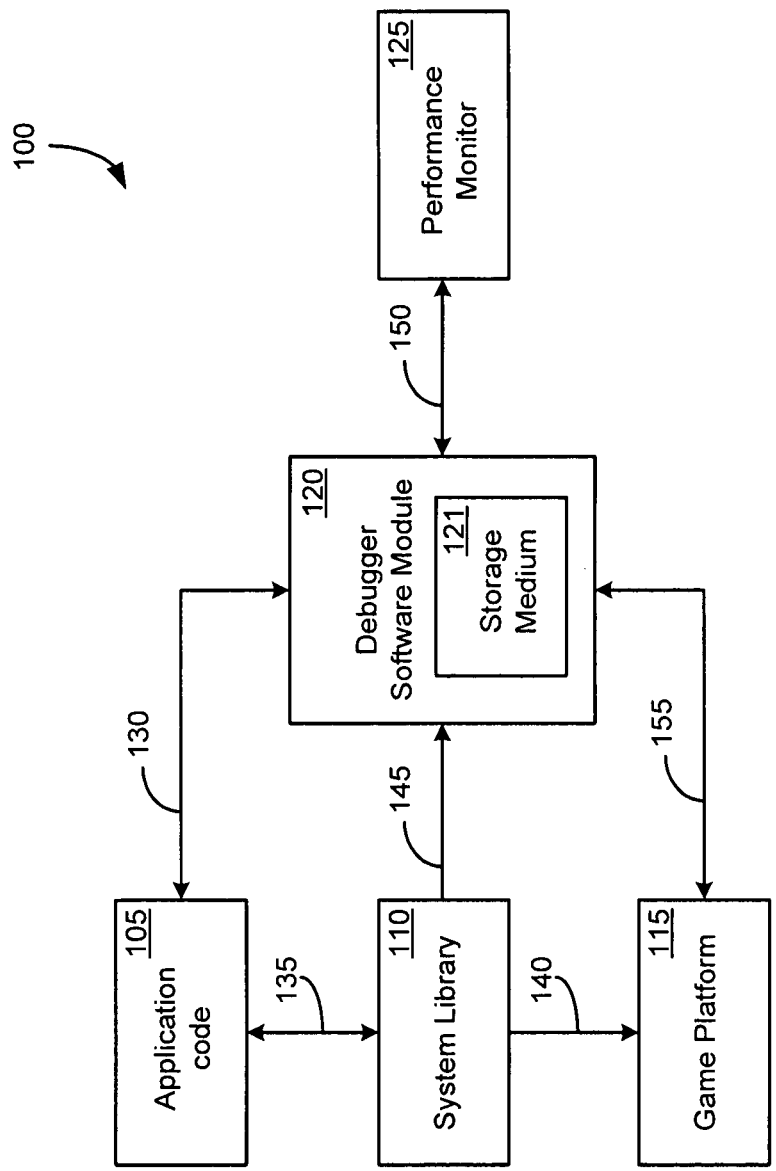
FIG. 1 shows an exemplary system for analyzing the performance of a video game using non-intrusive capture and storage of run-time game data.

FIG. 1 shows an exemplary system 100 for analyzing the performance of a video game using non-intrusive capture and storage of run-time game data. System 100 includes a game platform 115 that constitutes the hardware upon which the video game is executed. One example, among many, of such a game platform is the Microsoft Xbox 360®. Typically, game platform 115 contains a central processing unit (CPU) that is used for executing game code. An additional processor referred to as a graphics processor unit (GPU) is generally coupled to the CPU. The GPU is typically dedicated for running processor-intensive graphics code for displaying game-related images on a display (not shown) of game platform 115. In many cases, the CPU and the GPU use different clocks, which, consequently accommodates asynchronous, parallel operation of the two processors. As a result, at certain times, the GPU may be too busy to comply with a request from the CPU, thereby leading to an execution wait time.

Application code 105 is software/firmware that is executed for running the video game on game platform 115. Application code 105 may utilize a number of pre-packaged software modules that are stored in one or more system libraries such as system library 110. This process is carried out using a first communication link 135 that couples application code 105 to system library 110, and communication link 140 that couples system library 110 to game platform 115.

Debugger software module 120 is communicatively coupled to application code 105, system library 110, and game platform 115 (via links 130, 145 and 155 respectively). The coupling is configured for non-intrusively capturing run-time game data. In one exemplary embodiment, debugger software module 120 is implemented using Microsoft Xbox Debugging Module (XBDM®). The captured run-time game data is stored in storage medium 121.

Debugger software module 120 is also coupled to a performance monitor 125 via a communications link 150. Performance monitor 125 is configured for providing control signals for controlling debugger software module 120 as well as for accessing run-time game data stored in storage medium 121. The accessed run-time data may be displayed in various formats that are suitable for analyzing gaming performance. Typically, performance monitor 125 obtains "lightweight" data that is a part of the run-time game data stored in storage medium 121. Lightweight data is so called because it enables performance monitor 125 to generate viewable information that provides a holistic, high-level view of video game performance without cluttering up this holistic view with details that can be obtained as and when needed.

It will be understood that performance monitor 125 may be implemented in various alternative ways. However, in one exemplary application, performance monitor 125 is implemented using tools such as Microsoft PIX® or Microsoft Dr. PIX®.

Storage medium 121 may be implemented in various alternative ways as well. In a first exemplary embodiment, a first-in-first-out (FIFO) memory device of a suitable size may be used for storage of run-time game data. The FIFO may be further configured as a circular buffer in certain applications. In an example embodiment, this can be carried out by routing the output data from the FIFO back into the input of the FIFO thereby permitting circular logging of the run-time game data. In an example configuration the circular buffer is a contiguous region of hard drive space and space is reclaimed when enough data has been recorded to wrap the buffer. In a second embodiment, storage medium 121 is a storage buffer such as a random access memory (RAM) device, configured for short-term storage of run-time game data. The data stored in this short-term storage buffer may be transferred regularly or intermittently, from the short-term storage buffer into a long-term storage buffer such as a larger capacity hard disk. Alternatively, new run-time game data may be written into the RAM in selected locations that may be empty or may contain old data that is no longer needed.

Operation of system 100 will now be described. When application code 105 is executed, certain system calls are made to system library 110, which in turn provides instructions for running the video game on game platform 115. A few non-exhaustive examples of the contents of system library 110 include: code for displaying graphics in a display window (not shown) of game platform 115, code for generating audio in an audio transducer (not shown) of game platform 115, and code for coupling game platform 115 to a network (not shown) such as the Internet.

Concurrent to the process described above, debugger software module 120 is configured for capturing run-time game data from each of the application code 105, system library 110, and game platform 115. Specifically, run-time parameters run-time measurements (e.g., measured time to perform an action) associated with hardware of game platform 115 is transported from game platform 115 to debugger software module 120, which then stores this data in storage medium 121. A non-exhaustive list of run-time parameters associated with hardware of game platform 115 includes: execution wait-time, GPU activity status, CPU activity status, CPU memory usage, GPU memory usage, bus activity, bus contention, and interrupt-related activity.

Run-time parameters/measurements associated with execution of application code 105 are transported from application code 105 via link 130, as well as from system library 110 via link 145, to debugger software module 120, which then stores these run-time parameters/measurements in storage medium 121. In an example configuration, there is no physical link to the debugger software module, rather a section of code on the development kit is utilized rather than a separate piece of hardware. A non-exhaustive list of run-time parameters/measurements associated with execution of application code 105 includes: frame rendering information, stack information, application programming interface (API) calls, thread switches, artificial intelligence (AI) routines, and GPU related activity.

Capturing of run-time game data is carried out in a non-linear capture format that is designed to have minimal impact upon game performance. This minimization is desirable because the capture process is typically configured to run continuously in the background while the video game is in progress. A few examples will be used to illustrate the non-linear capture format. In a first example, a run-time parameter associated with hardware of game platform 115 may be captured only when the GPU is executing a low-priority task or is in an idle state. Similarly, a parameter pertaining to the CPU may be captured only when the CPU is in an idle state or in a wait state. In a second example, a run-time parameter associated with hardware of game platform 115 is captured through a hardware device such as a data buffer that can continuously couple data out of a data bus without affecting data throughput to other hardware devices coupled to the data bus.

Capture of run-time parameters/measurements associated with execution of application code 105 is also carried out using the non-linear capture format. In one example, the capture is carried out upon malfunctioning code such as those associated with halted threads, unfulfilled interrupt requests, and abnormal frame rendering. Capturing such items that are not currently active, avoids impacting game performance, which can continue to run without interruption. However, the capture is not limited to such items, because pertinent information is also desirable from currently running processes. For example, in one typical capture process, debugger software module 120 tracks each instrumented API call and stores information pertaining to the API call as well as time stamps associated with the API call. In other capture processes, debugger software module 120 captures and stores run-time game data associated with call stacks, timing of events, and user data.

In addition to the capture of the run-time game data described above, in another exemplary embodiment, debugger software module 120 captures and stores video image information in the form of one or more video images that are displayed in the display (not shown) of game platform 115. This image information is useful in certain cases for troubleshooting purposes. For example, if a particular video image contains a black square area, a developer can use this information to examine frame rendering game data at the time of occurrence of the video image to look for anomalies in the execution of a certain portion of application code 105.

In various exemplary embodiments, run-time game data whether in the form of run-time parameters/measurements associated with execution of application code 105 or in the form of run-time parameters/measurements associated with hardware of game platform 115 is captured using a frame format, so as to allow performance monitor 125 to display performance data in a frame-by-frame format. Consequently, a developer can selectively view one or more frames where a performance glitch occurred some time earlier for carrying out performance analysis on a frame-by-frame basis. The developer can alternatively view the performance data in a timing mode that accommodates performance analysis on a time-related basis. Viewing of performance data will be described below in further detail using other figures.

Figure 2:
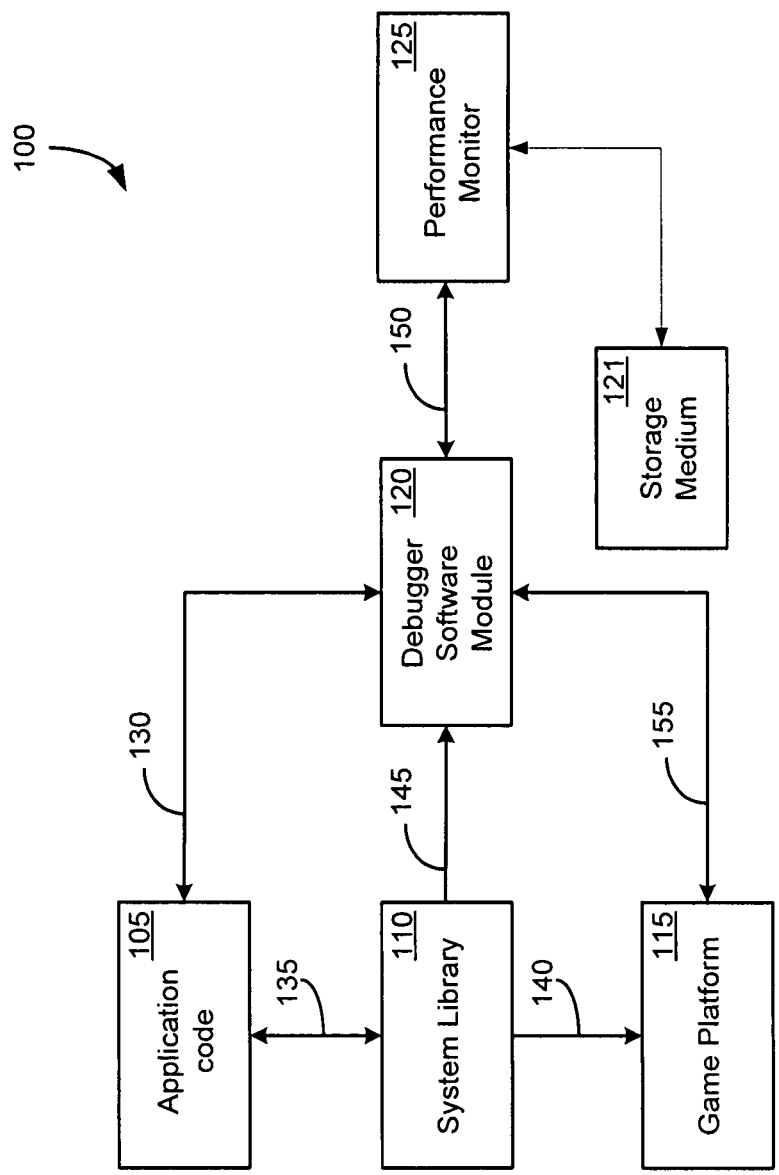
FIG. 2 shows the system of FIG. 1 incorporating an alternative implementation of a storage medium.

FIG. 2 shows the system 100 incorporating an alternative implementation of storage medium 121. In this exemplary implementation, storage medium 121 is an external storage medium, such as, for example, a hard disk of a personal computer (PC). Unlike the implementation shown in FIG. 1, in this case, storage medium 121 is located external to debugger software module 120. Irrespective of the location of storage medium 121, the storage of run-time game data is carried out using a non-contiguous storage format. In accordance with the non-contiguous storage format, the same type of type of run-time game data is not required to be stored contiguously. For example, a block of video data can be stored next to a block of audio data, which can be stored next to a block of GPU data, etc. Thus, run-time data is not required to be stored contiguously accordance to type. This format may be described with an example, wherein run-time parameters/measurements associated with the GPU in game platform 115 is stored in storage medium 121. Over a certain period of time (say, between $t_1$ and $t_2$) debugger software module 120 captures a first set of GPU parameters and stores this first set of GPU parameters in a first memory segment of storage medium 121. Debugger software module 120 then spends the next period of time (say, between $t_2$ and $t_3$) in capturing some run-time parameters/measurements associated with an element other than the GPU (say an API call, for example), which is then stored in a second memory segment of storage medium 121. The second memory segment is located adjacent to the first memory segment. Debugger software module 120 then spends the next period of time (say, between $t_3$ and $t_4$) in once again capturing a second set of GPU parameters. The second set of GPU parameters is stored in a third memory segment located adjacent to the second memory segment of storage medium 121.

As can be understood the first and second set of GPU parameters are now stored in segments one and three that are not located adjacent to one another. This method of non-contiguous storage enables debugger software module 120 to capture run-time game data in accordance with a capture sequence that is non-linear and most suitable for having the least impact upon game performance. At a later instance in time, when a developer desires to review GPU performance, performance monitor 125 accesses the first and the third memory segments of storage medium 121 and suitably concatenates the GPU data for review by the developer.

Figure 3:
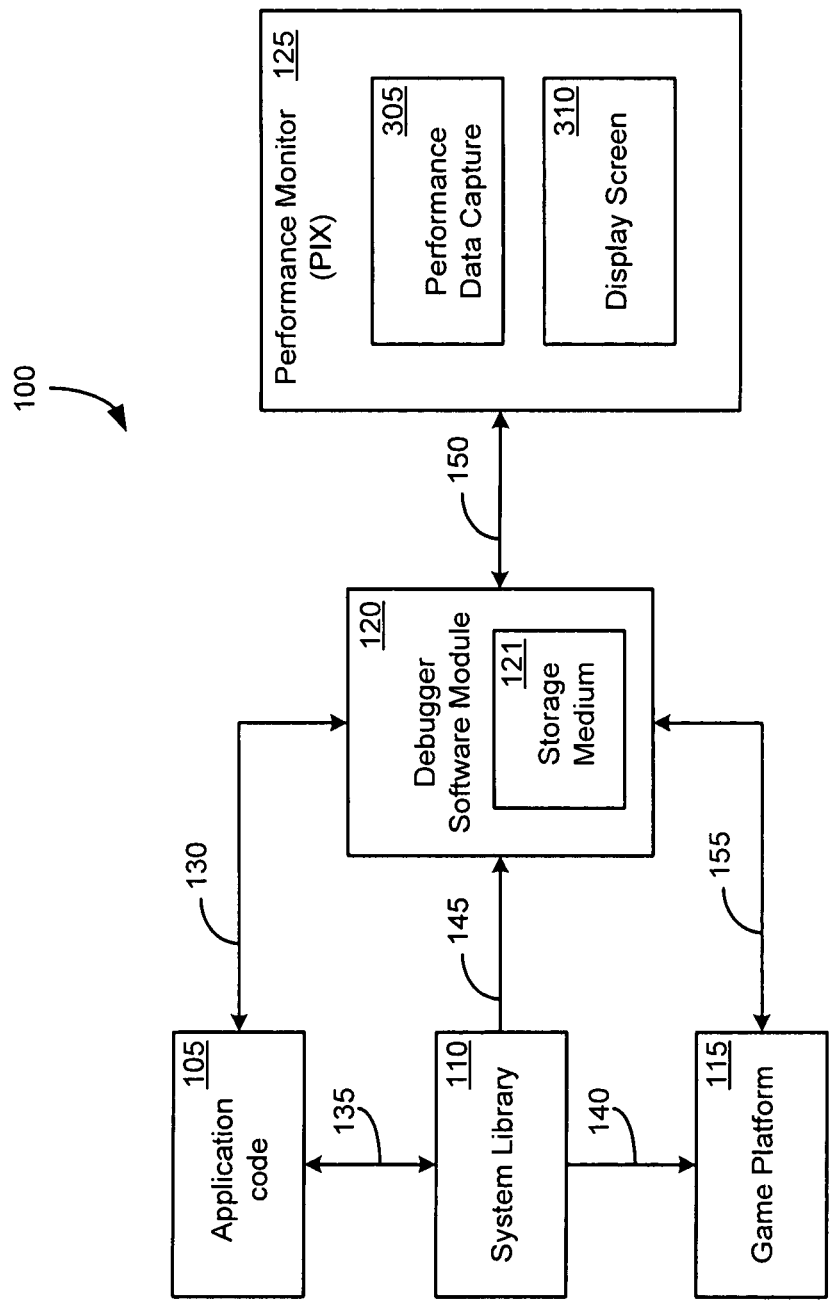
FIG. 3 shows some exemplary components of a performance monitor that is a part of the system shown in FIG. 1.

FIG. 3 shows some exemplary components of performance monitor 125. Performance data capture 305 is configured for obtaining lightweight data that is a part of the run-time game data stored in storage medium 121. Display screen 310 is used to display the lightweight data in a suitable display format. A few examples of such display formats are described below using other figures.

Figure 4:
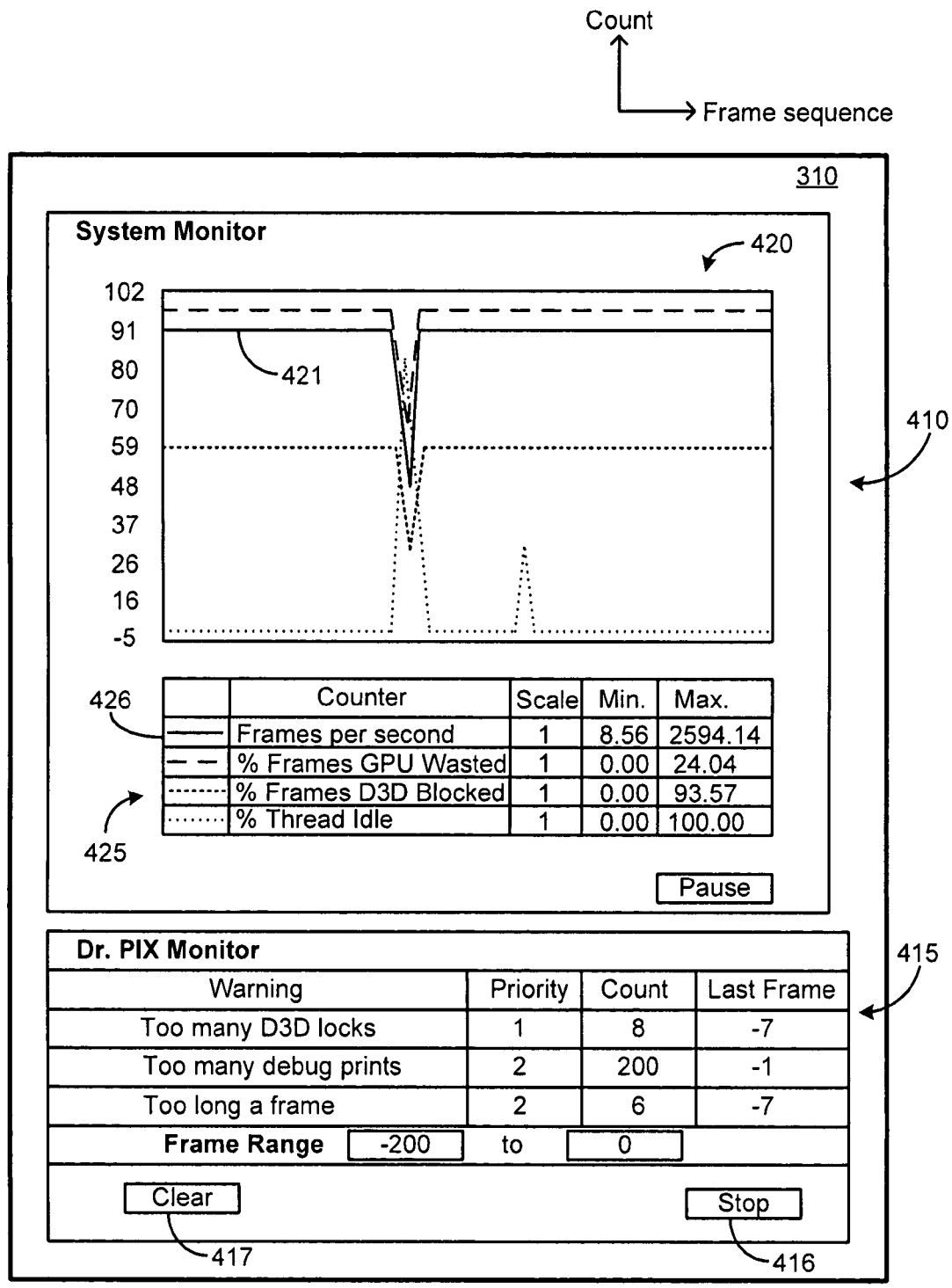
FIG. 4 shows a first exemplary view on a display that is a part of the performance monitor of FIG. 3.

FIG. 4 shows a first exemplary view of a display on display screen 310. The display may be configured in a variety of different formats. For example, in one implementation, display screen 310 uses a windows format in accordance with Microsoft Windows®. However, in other implementations, other types of displays and display formats may be used. The exemplary display screen 310 of FIG. 4 shows a system monitor display window 410 and a diagnostics display window 415 (labeled as Dr. PIX Monitor).

System monitor display window 410, hereinafter referred to as system monitor 410, provides a graphical display 420 of run-time parameters/measurements in terms of data statistics captured over a sequence of video gaming frames. In one example, the data statistics is a count value pertaining to the number of occurrences of a monitored gaming parameter such as, for example, D3D locks. A D3D lock is a lock used to guard data shared by CPU and GPU devices. Consequently, the number of D3D locks occurring on a real-time frame-by-frame basis can be seen in system monitor 410. It will be understood that various run-time parameters/measurements can be selected for monitoring, together with selectable priority levels and other performance metrics. A few non-exhaustive examples of viewable run-time parameters/measurements include: redundant states, number of thread switches in a kernel, sleep time, ratio of bytes read to number of requests.

Below the graphics display 420 of monitor display window 410, is a tabular display 425 that provides numerical information pertaining to the various graphs displayed in graphical display 420. The first column of tabular display 425 identifies a particular graph. In the illustration of FIG. 4, the graphs have been identified by various types of lines such as solid, dashed and dotted lines. However, this format has been utilized merely for ease of description. In a practical set-up, each of the graphs may be identified by a unique color and each of the colors is identified in the first column of tabular display 425. For example, graph 421 (which is identified in FIG. 4 using a solid line), may be identified by a red color and cell 426 of the first column of tabular display 425 would be shaded red correspondingly. Other identification means may be similarly used for identifying the individual graphs.

The second column of tabular display 425 provides list of performance metrics associated with various run-time parameters/measurements. In this exemplary embodiment, the entries in the second column correspond to various counters that are used to obtain count values of certain performance metrics that are used to analyze the performance of the video game. The counters may be provided to correspond to a set of pre-determined performance metrics that are selected by a manufacturer of performance analyzer system 400. Alternatively, performance analyzer system 400 may be configured to permit a developer or other individual to define one or more counters for various performance metrics that are of particular interest to the developer.

The third column of tabular display 425 lists the scaling factors for each of the graphs of graphics display 420, while the fourth and fifth columns provide minimum and maximum values of the corresponding monitored run-time parameters/measurements.

Diagnostics display window 415 (Dr. PIX Monitor) provides data statistics pertaining to the run-time parameters/measurements, and specifically provides data related to one or more monitored parameters that fall outside a pre-determined threshold. In the exemplary view shown in FIG. 4, a first column of diagnostics display window 415 lists warnings related to the monitored parameters. The first warning indicates "too many D3D locks," while the second warning indicates "too many debug prints." The second column of diagnostics display window 415 lists the priority level of each of the warnings of column 1. The priority levels may be pre-determined by a manufacturer of performance monitor 125, or may be selectably set by a game developer or other user of performance monitor 125. The third column of diagnostics display window 415 lists the count value for each of the warnings of column 1, while the fourth column provides frame information of where the warning occurred in the sequence of frames displayed in graphical display 420.

Diagnostics display window 415, as well as system monitor 410 may include soft-keys for carrying out various operations such as, for example, Pause, Stop, Print, Store, Ignore, Hide, Edit, and Clear. While the functionality of some of these soft-keys is self-evident, it may be pertinent to point out certain features in some others. The Save key (not shown) is used to save the warnings in a database or file; the Ignore key (not shown) is used to selectively ignore certain warnings; the Hide key (not shown) is used to hide diagnostics display window 415; the Edit key (not shown) to edit the warning conditions so as to make them visible or invisible; and the Clear key (soft-key 417) is used to clear the contents of diagnostics display window 415. The Stop key (soft-key 416) is used to freeze the display so that a developer can examine and analyze displayed parameters.

Furthermore, each of the cells in tabular display 425 and/or diagnostics display window 415 may be configured in various ways. For example, a cell may be configured as a soft-key, which when activated, leads to a further operation such as providing an additional display. A cell may be further configured to be editable, whereby for example, the text content may be modified or a numerical parameter set to a desired value.

Figure 5:
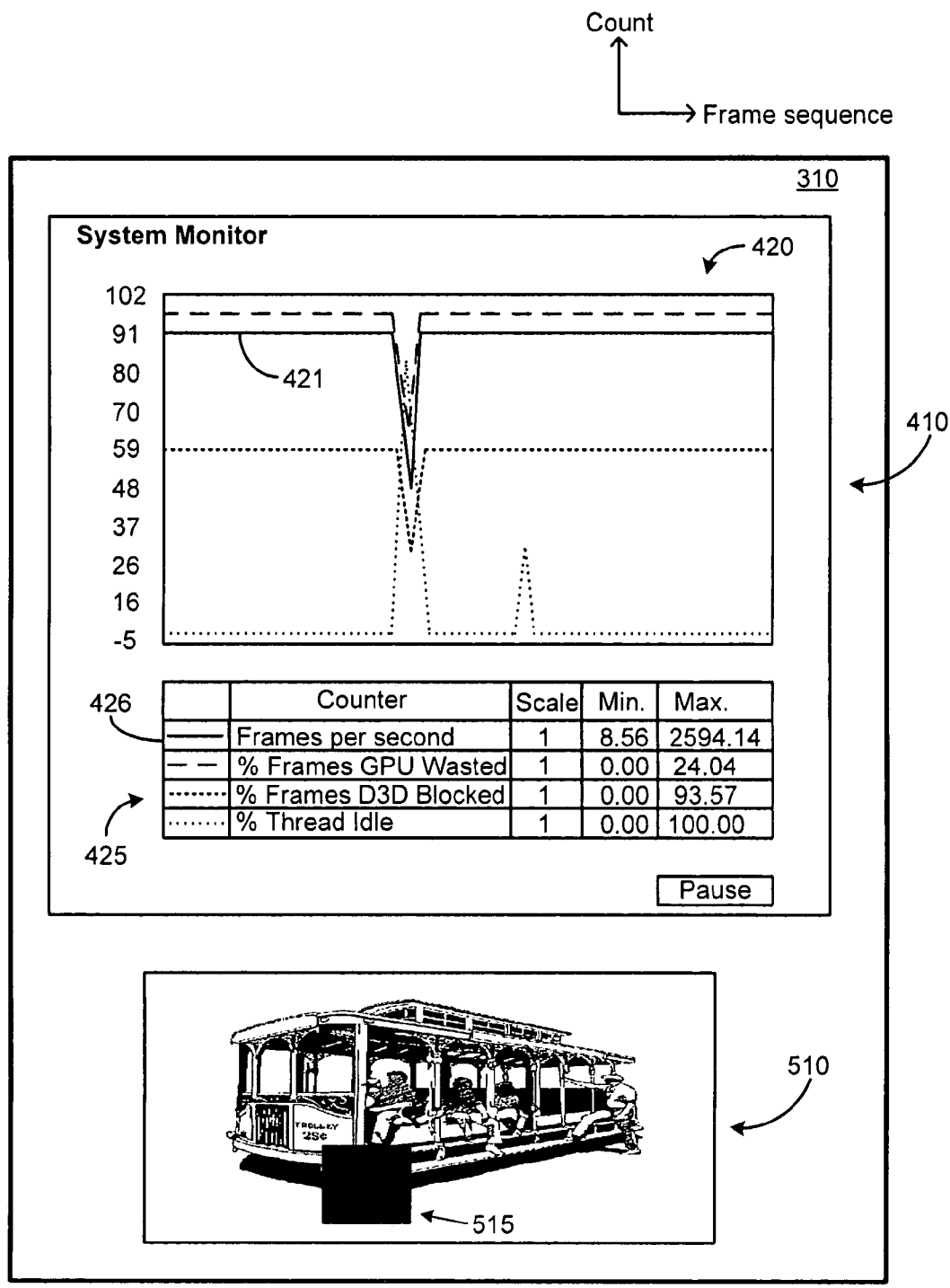
FIG. 5 shows a second exemplary view on the display of the performance monitor.

FIG. 5 shows a second exemplary view on display screen 310, which is a part of performance monitor 125. In this second exemplary view, the display shows a system monitor display window 410 as described above. However, in place of a diagnostics display window 415, a video image 510 is displayed. Video image 510 corresponds to one or more images that were projected upon a display (not shown) of game platform 115 for viewing by a game player. In this example, system monitor display window 410 has been configured to display frame data that coincides with a certain period of time during which video image 510 was viewable by the game player. A developer can examine video image 510 in conjunction with frame-related information obtained from system monitor display window 410 to analyze video game performance. For example, video image 510 contains an image aberration that is visible as a black square area 515. A developer can correlate this image aberration to a spike seen in graph 421 (for example), and use this correlation to identify and troubleshoot a certain portion of application code 105.

Figure 6:
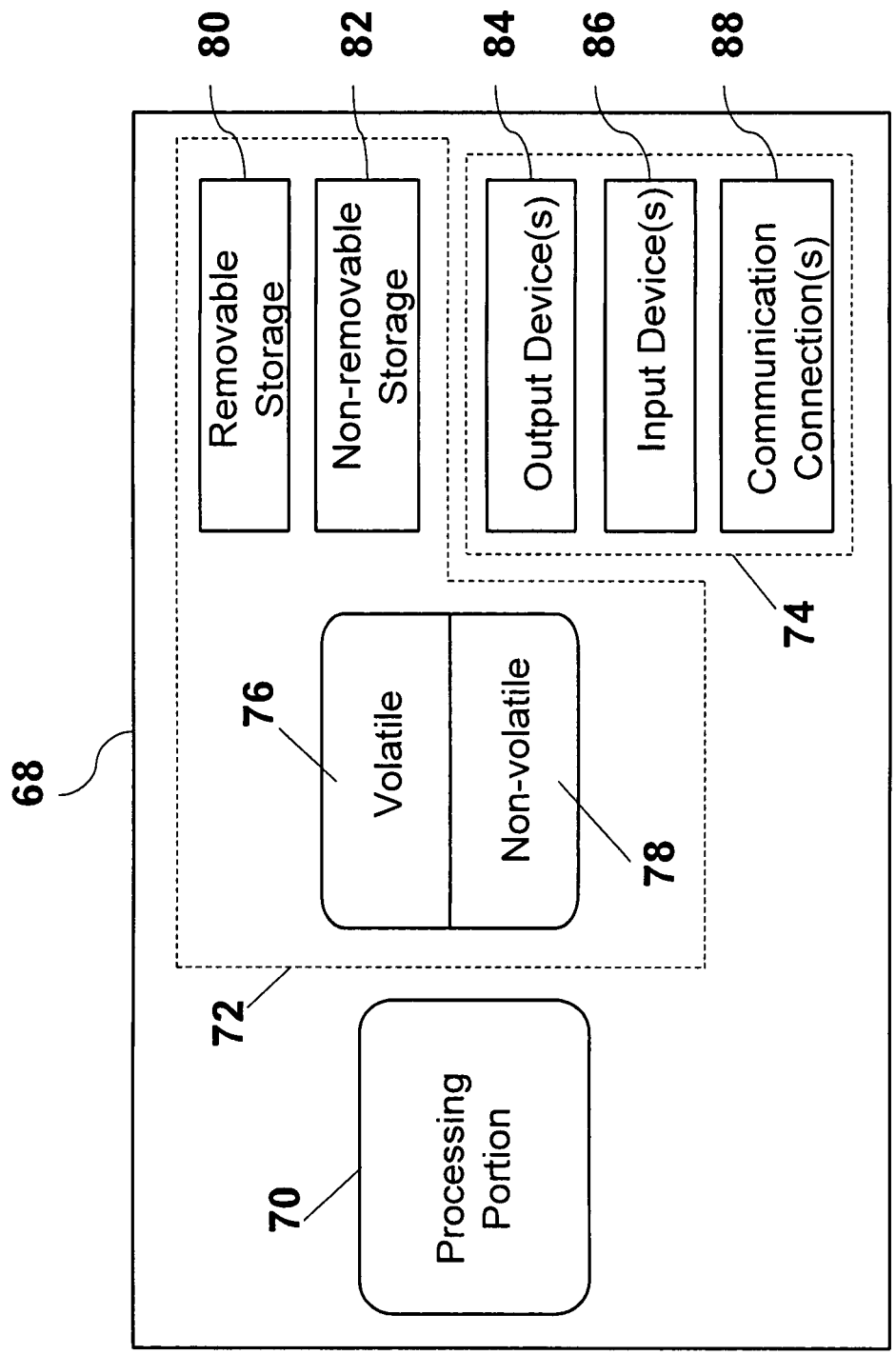
FIG. 6 is a diagram of an exemplary processor for implementing non-intrusive capture and storage of run-time game data.

FIG. 6 is a diagram of an exemplary processor 68 for implementing a system, or portions thereof of a system for carrying out non-intrusive capture and storage of run-time game data, and/or for analyzing the performance of a video game. The processor 68 comprises a processing portion 70, a memory portion 72, and an input/output portion 74. The processing portion 70, memory portion 72, and input/output portion 74 are coupled together (coupling not shown in FIG. 5) to allow communications therebetween. The input/output portion 74 is capable of providing and/or receiving components utilized to perform non-intrusive capture and storage of run-time game data, and/or for analyzing the performance of the video game as described above. For example, when exemplary processor 68 is used for performing the functionality of debugger software module 120 and/or performance monitor 125, the input/output portion 74 is capable of interfacing with one or more of application code 105, system library 110 and game platform 115 described above.

The processing portion 70 is capable of implementing various functions of the system such as those provided by debugger software module 120, performance monitor 125, application code 105, system library 110 and game platform 115.

The processor 68 can be implemented as a client processor and/or a server processor. In a basic configuration, the processor 68 can include at least one processing portion 70 and memory portion 72. The memory portion 72 can store any information utilized in conjunction with non-intrusive capture and storage of run-time game data, and/or for analyzing the performance of the video game. Depending upon the exact configuration and type of processor, the memory portion 72 can be volatile (such as RAM) 76, non-volatile (such as ROM, flash memory, etc.) 78, or a combination thereof. The processor 68 can have additional features/functionality. For example, the processor 68 can include additional storage (removable storage 80 and/or non-removable storage 82) including, but not limited to, magnetic or optical disks, tape, flash, smart cards or a combination thereof. Computer storage media, such as memory portion 72, 76, 78, 80, and 82, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 68. Any such computer storage media can be part of the processor 68.

The processor 68 can also contain communications connection(s) 88 that allow the processor 68 to communicate with other devices, such as other devices, for example. Communications connection(s) 88 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 68 also can have input device(s) 86 such as keyboard, mouse, pen, voice input device, touch input device, etc. Output device(s) 84 such as a display, speakers, printer, etc. also can be included.

Figure 7:
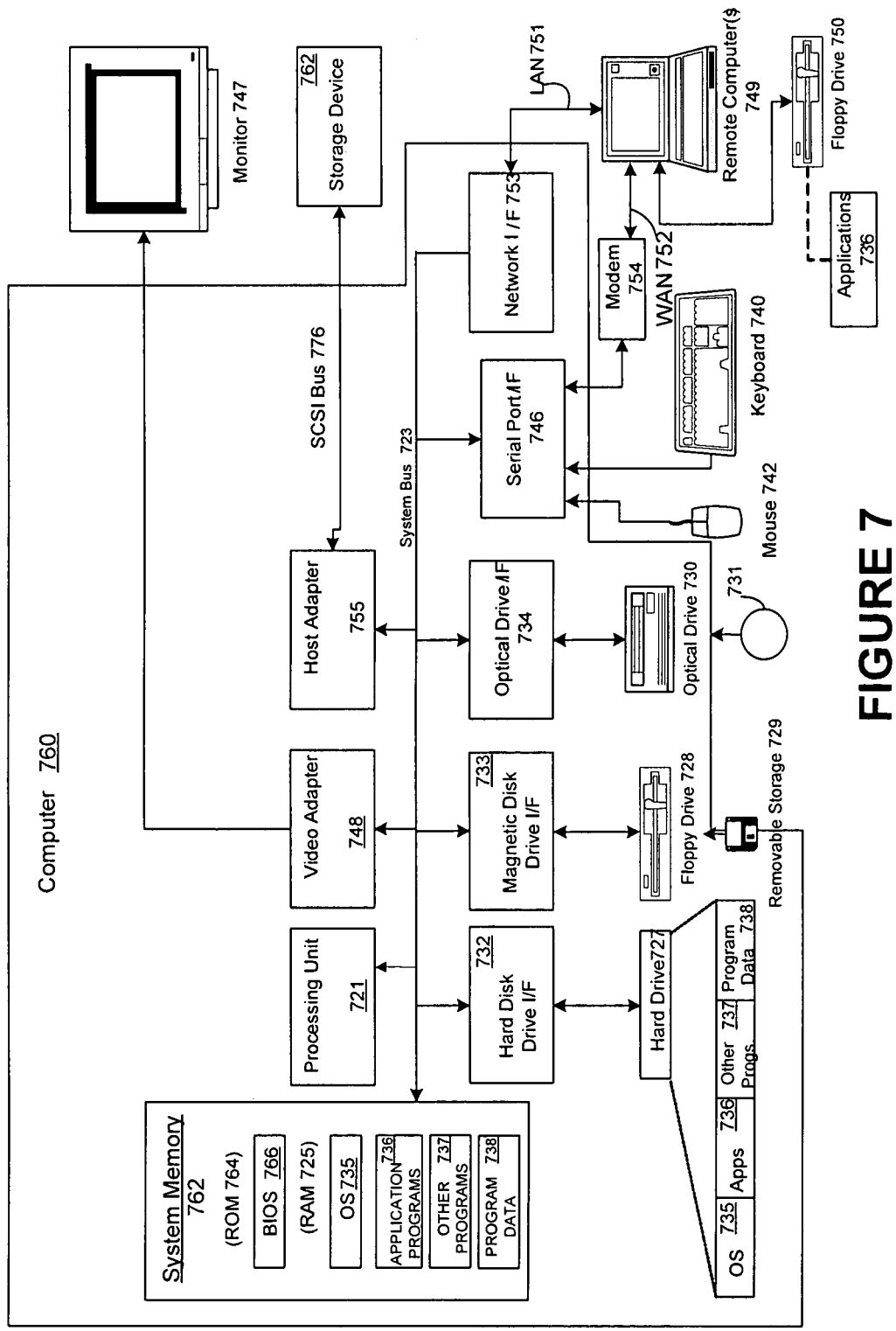
FIG. 7 is a depiction of a suitable computing environment in which non-intrusive capture and storage of run-time game data can be implemented.

FIG. 7 and the following discussion provide a brief general description of a suitable computing environment in which non-intrusive capture and storage of run-time game data and/or analysis of the performance of a video game can be implemented. Although not required, various aspects of non-intrusive capture and storage of run-time game data and/or analysis of the performance of a video game can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of non-intrusive capture and storage of run-time game data and/or analysis of the performance of a video game can be practiced with other computer system configurations, including hand held devices, multi processor systems, microprocessor based or programmable consumer electronics, network PCs, minicomputers, mainframe computers, and the like. Further, non-intrusive capture and storage of run-time game data and/or analysis of the performance of a video game also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 721, the memory (both ROM 764 and RAM 725), the basic input/output system (BIOS) 766, and various input/output (I/O) devices such as a keyboard 740, a mouse 762, a monitor 747, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with debugger software module 120, performance monitor 125, application code 105, system library 110 and/or game platform 115.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 7, an exemplary general purpose computing system includes a conventional computing device 760 or the like, including a processing unit 721, a system memory 762, and a system bus 723 that couples various system components including the system memory to the processing unit 721. The system bus 723 may be any of several types of bus structures including a memory bus or memory controller, a peripheral bus, and a local bus using any of a variety of bus architectures. The system memory includes read only memory (ROM) 764 and random access memory (RAM) 725. A basic input/output system 766 (BIOS), containing basic routines that help to transfer information between elements within the computing device 760, such as during start up, is stored in ROM 764. The computing device 760 may further include a hard disk drive 727 for reading from and writing to a hard disk (hard disk not shown), a magnetic disk drive 728 (e.g., floppy drive) for reading from or writing to a removable magnetic disk 729 (e.g., floppy disk, removal storage), and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer readable media provide non volatile storage of computer readable instructions, data structures, program modules and other data for the computing device 760. Although the exemplary environment described herein employs a hard disk, a removable magnetic disk 729, and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 729, optical disk 731, ROM 764, or RAM 725, including an operating system 735, one or more application programs 736, other program modules 737, and program data 738. A user may enter commands and information into the computing device 760 through input devices such as a keyboard 740 and pointing device 762 (e.g., mouse). Other input devices (not shown) may include a microphone, joystick, game pad, satellite disk, scanner, or the like. These and other input devices are often connected to the processing unit 721 through a serial port interface 746 that is coupled to the system bus, but may be connected by other interfaces, such as a parallel port, game port, or universal serial bus (USB). A monitor 747 or other type of display device is also connected to the system bus 723 via an interface, such as a video adapter 748. In addition to the monitor 747, computing devices typically include other peripheral output devices (not shown), such as speakers and printers. The exemplary environment of FIG. 6 also includes a host adapter 755, Small Computer System Interface (SCSI) bus 756, and an external storage device 762 connected to the SCSI bus 756.

The computing device 760 may operate in a networked environment using logical connections to one or more remote computers, such as a remote computer 749. The remote computer 749 may be another computing device (e.g., personal computer), a server, a router, a network PC, a peer device, or other common network node, and typically includes many or all of the elements described above relative to the computing device 760, although only a memory storage device 750 (floppy drive) has been illustrated in FIG. 6. The logical connections depicted in FIG. 6 include a local area network (LAN) 751 and a wide area network (WAN) 752. Such networking environments are commonplace in offices, enterprise wide computer networks, intranets and the Internet.

When used in a LAN networking environment, the computing device 760 is connected to the LAN 751 through a network interface or adapter 753. When used in a WAN networking environment, the computing device 760 can include a modem 754 or other means for establishing communications over the wide area network 752, such as the Internet. The modem 754, which may be internal or external, is connected to the system bus 723 via the serial port interface 746. In a networked environment, program modules depicted relative to the computing device 760, or portions thereof, may be stored in the remote memory storage device. It will be appreciated that the network connections shown are exemplary and other means of establishing a communications link between the computers may be used.

While it is envisioned that numerous embodiments of non-intrusive capture and storage of run-time game data and/or analysis of the performance of a video game are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for non-intrusive capture and storage of run-time game data and/or analysis of the performance of a video game, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing non-intrusive capture and storage of run-time game data and/or analysis of the performance of a video game.

The program(s) can be implemented in assembly or machine language, if desired. In any case, the language can be a compiled or interpreted language, and combined with hardware implementations. The methods and apparatuses for implementing non-intrusive capture and storage of run-time game data and/or analysis of the performance of a video game also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of non-intrusive capture and storage of run-time game data and/or analysis of the performance of a video game. Additionally, any storage techniques used in connection with non-intrusive capture and storage of run-time game data and/or analysis of the performance of a video game can invariably be a combination of hardware and software.

While non-intrusive capture and storage of run-time game data for analyzing the performance of a video game has been described above using exemplary embodiments and figures, it is to be understood that other similar embodiments can be used or modifications and additions can be made to the described embodiments for performing the same functions without deviating therefrom. Therefore, non-intrusive capture and storage of run-time game data and/or analysis of the performance of a video game as described herein should not be limited to any single embodiment, but rather should be construed in breadth and scope in accordance with the appended claims.

What is claimed:

1. A method for analyzing performance of a video game, the method comprising:
    capturing, using a frame format, run-time game data responsive to hardware of a game platform being in a minimal impact state, wherein the run-time game data comprises run-time parameters associated with execution of application code of the video game and run-time parameters associated with the hardware of the game platform upon which the application code of the video game is being executed;
    storing the run-time parameters associated with the hardware of the game platform using a non-contiguous storage format in accordance with a capture sequence that is non-linear, wherein the hardware of the game platform is a graphics processor unit (GPU);
    responsive to a request to review performance of the hardware of the game platform, concatenating the stored run-time parameters associated with the hardware of the game platform in accordance with the capture sequence that was non-linear; and
    displaying performance data in a frame-by-frame format, based on the run-time game data captured using the frame format.

2. The method of claim 1, further comprising:
    capturing a video image when the application code of the video game is being executed; and
    storing the video image along with the run-time game data.

3. The method of claim 2, further comprising:
    identifying a performance glitch during execution of the application code of the video game;
    providing a performance monitor display; and
    displaying in the performance monitor display, at least one of the stored video image or a portion of the stored run-time game data corresponding to a time of occurrence of the performance glitch.

4. The method of claim 3, wherein identifying the performance glitch comprises identifying an abnormal execution time for a portion of the application code of the video game.

5. The method of claim 3, wherein identifying the performance glitch comprises visually observing a display screen of the video game during execution of the application code of the video game.

6. The method of claim 1, wherein the minimal impact state is at least one of:
    the hardware of the game platform executing a low priority task; or
    the hardware of the game platform being in an idle state.

7. The method of claim 1, wherein the hardware of the game platform comprises at least one of a central processing unit (CPU) or a data buffer.

8. The method of claim 1, wherein the hardware of the game platform comprises a central processing unit (CPU) coupled to the graphics processor unit (GPU), and wherein the coupling is configured to permit asynchronous, parallel operation of the CPU and the GPU.

9. The method of claim 8, further comprising:
    identifying a performance glitch during execution of the application code of the video game;
    providing a performance monitor display;
    retrieving from storage, run-time game data of the CPU relative to the GPU; and
    displaying in the performance monitor display, at least one of the run-time parameters and run-time measurements of the CPU relative to the GPU.

10. The method of claim 9, further comprising:
    retrieving from storage, at least one run-time parameter associated with execution of the application code of the video game; and
    displaying in the performance monitor display, the at least one run-time parameter associated with execution of the application code of the video game along with at least one run-time parameter of the CPU relative to the GPU.

11. A system for analyzing performance of a video game, the system comprising:
    a game platform configured to run the video game;
    a debugger software module coupled to the game platform, wherein the debugger software module is configured to:
        capture, using a frame format, run-time game data responsive to hardware of the game platform being in a minimal impact state, wherein the run-time game data comprises run-time parameters associated with execution of application code of the video game and run-time parameters associated with the hardware of the game platform upon which the application code of the video game is being executed,
        store the run-time parameters associated with the hardware of the game platform using a non-contiguous storage format in accordance with a capture sequence that is non-linear, wherein the hardware of the game platform is a graphics processor unit (GPU), and
        responsive to a request to review performance of the hardware of the game platform, concatenate the stored run-time parameters associated with the hardware of the game platform in accordance with the capture sequence that was non-linear; and
    a performance monitor configured to display performance data in a frame-by-frame format, based on the run-time game data captured using the frame format.

12. The system of claim 11, further comprising:
a storage buffer configured to perform circular logging of the run-time game data.

13. The system of claim 11, further comprising:
a short-term storage buffer coupled to a long-term storage buffer, wherein the short-term storage buffer is configured to store the run-time game data for a first amount of time, and wherein the long-term storage buffer is configured to store the run-time game data for a second amount of time.

14. The system of claim 11, wherein the performance monitor is further configured to display at least a portion of stored run-time game data over a user-selected period of time.

15. The system of claim 11, wherein the hardware of the game platform comprises a central processing unit (CPU) coupled to the graphics processor unit (GPU), wherein the coupling is configured to permit asynchronous, parallel operation of the CPU and the GPU, and wherein the performance monitor is further configured to display run-time parameters of the CPU relative to the GPU.

16. A computer-readable storage medium that is not a transitory signal, the computer-readable storage medium having stored thereon computer-readable instructions for performing the steps of:
capturing, using a frame format, run-time game data responsive to hardware of a game platform being in a minimal impact state, wherein the run-time game data comprises run-time parameters associated with execution of application code of a video game and run-time parameters associated with the hardware of the game platform upon which the application code of the video game is being executed;
storing the run-time parameters associated with the hardware of the game platform using a non-contiguous storage format in accordance with a capture sequence that is non-linear, wherein the hardware of the game platform is a graphics processor unit (GPU);
responsive to a request to review performance of the hardware of the game platform, concatenating the stored run-time parameters associated with the hardware of the game platform in accordance with the capture sequence that was non-linear; and
displaying performance data in a frame-by-frame format, based on the run-time game data captured using the frame format.

17. The computer-readable storage medium of claim 16, having further stored thereon computer-readable instructions for performing the step of:
storing the run-time game data using a storage buffer configured to perform circular logging of the run-time game data.

18. The computer-readable storage medium of claim 16, having further stored thereon computer-readable instructions for performing the steps of:
capturing a video image when the application code of the video game is being executed; and
storing the video image along with the run-time game data.

19. The computer-readable storage medium of claim 18, having further stored thereon computer-readable instructions for performing the steps of:
providing a performance monitor display; and
displaying in the performance monitor display, at least one of the stored video image or a portion of the stored run-time game data corresponding to a time of occurrence of a performance glitch.

20. The computer-readable storage medium of claim 18, having further stored thereon computer-readable instructions for performing the step of:
capturing run-time parameters of a central processing unit (CPU) coupled to the graphics processor unit (GPU), wherein the CPU and the GPU are components of the game platform.

* * * * *